(12) United States Patent
Truglio et al.

(10) Patent No.: US 7,631,949 B2
(45) Date of Patent: Dec. 15, 2009

(54) LAST CAR BREAKAWAY PROTECTION SYSTEM

(75) Inventors: James R. Truglio, Watertown, NY (US); Bryan McLaughlin, Watertown, NY (US); Lawrence E. Vaughn, Watertown, NY (US); Vincent S. Guarrera, Jr., Watertown, NY (US); Eric Wright, Evans Mill, NY (US)

(73) Assignee: New York Air Brake Corporation, Watertown, NY (US)

( * ) Notice: Subject to any disclaimer, the term of this patent is extended or adjusted under 35 U.S.C. 154(b) by 0 days.

(21) Appl. No.: 11/913,747

(22) PCT Filed: Feb. 3, 2006

(86) PCT No.: PCT/US2006/003763

§ 371 (c)(1),
(2), (4) Date: Jun. 12, 2008

(87) PCT Pub. No.: WO2006/124083

PCT Pub. Date: Nov. 23, 2006

(65) Prior Publication Data

US 2009/0218879 A1    Sep. 3, 2009

Related U.S. Application Data

(60) Provisional application No. 60/679,653, filed on May 11, 2005.

(51) Int. Cl.
*B60T 13/74* (2006.01)
(52) U.S. Cl. ............................. 303/66; 303/30; 303/81
(58) Field of Classification Search .................... 303/3, 303/7, 15, 29, 30, 66, 81, 82
See application file for complete search history.

(56) References Cited

U.S. PATENT DOCUMENTS 5,967,620 A    10/1999 Truglio et al.

*Primary Examiner*—Christopher P Schwartz

(57) ABSTRACT

A train including a brake pipe (14) and an electrical train line (50) extending from at least one locomotive through at least first and second cars which are adjacent to each other, the first and second cars each include a brake cylinder, reservoir and a brake valve The first car includes an electro-pneumatic brake valve which is responsive to electric signals on the train line to produce a first car pneumatic apply brake signal from the first reservoir and release brake signal for the first brake cylinder and the brake signal pipe (33) The first car also includes a first valve (31) to transmit the first brake signals to the brake signal pipe and to isolate the connection to the brake signal pipe for a breakaway at one of the cars The second car includes a pneumatic brake control valve which is responsive to the first car pneumatic brake signals on the brake signal pipe and brake pipe pressure m the brake pipe to produce a second car pneumatic apply and release brake signals for the second brake cylinder corresponding to the first apply and release brake signals The pneumatic brake control valve also produces a second car pneumatic apply brake signal from the second reservoir for an emergency pressure in the brake pipe and no brake signal on the brake signal pipe.

10 Claims, 5 Drawing Sheets

LAST CAR BREAKAWAY PROTECTION SYSTEM

CROSS-REFERENCE

This application claims the benefit of and incorporates herein by reference provisional application Ser. No. 60/679,653 filed May 11, 2005.

BACKGROUND AND SUMMARY OF THE DISCLOSURE

The present invention relates generally to brake systems for trains, and more specifically, to a brake system for trains having a mixture of electro-pneumatic (EP) brake valves and pneumatic brake valves on different cars.

In the U.S. and other countries which use the standard of the American Association of Railroads ("AAR"), railroads have been studying and implementing electro-pneumatic brake valves in the individual cars. Not all railroads are capable of or want a complete train with electro-pneumatic brake valves. Some railroads prefer to have a mixture of electro-pneumatic brake valve cars with pneumatic brake valve cars. In an electro-pneumatic train, the brake pipe is maintained at its full value and the electrical signals provided to the electro-pneumatic valves produce a pneumatic braking on the EP cars. Since the brake pipe is always at its full value or release, the pneumatic brake valve cars have to be controlled by an adjacent electro-pneumatic car. This will be accomplished by a separate brake signal pipe which connects the electro-pneumatic car to the adjacent pneumatic car. A problem arises if this brake signal pipe is disconnected, as is the brake pipe. One or both of the cars may not be able to automatically apply their brakes in response to a breakaway. This is especially critical to the last car on the train since it is not connected to any other car which may be capable of bringing that segment of the train to a stop.

One solution to the problem is providing a special electro-pneumatic last car which would be designed not to be connected to a brake signal pipe. For some railroads, the dedication of a special end car may not be convenient or desirable.

The present disclosure is directed to a train including a brake pipe and an electrical train line extending from at least one locomotive through at least first and second cars which are adjacent to each other and connected by a brake signal pipe. The first car includes a first brake cylinder, a first reservoir and an electro-pneumatic brake valve. The electro-pneumatic brake valve is responsive to electric signals on the train line to produce a first car pneumatic apply brake signal from the first reservoir and release brake signal for the first brake cylinder and the brake signal pipe. The first car also includes a first valve to transmit the first brake signals to the brake signal pipe and to isolate the connection to the brake signal pipe for a breakaway at one of the cars. The second car includes a second brake cylinder, a second reservoir, and a pneumatic brake control valve. The pneumatic brake control valve is responsive to the first car pneumatic brake signals on the brake signal pipe and brake pipe pressure in the brake pipe to produce a second car pneumatic apply and release brake signals for the second brake cylinder corresponding to the first apply and release brake signals. The pneumatic brake control valve also produces a second car pneumatic apply brake signal from the second reservoir for an emergency pressure in the brake pipe and no brake signal on the brake signal pipe.

This system allows both cars to apply their brakes for a brake-way condition no matter where they are in the train.

These and other aspects of the present method will become apparent from the following detailed description of the method, when considered in conjunction with accompanying drawings.

DETAILED DESCRIPTION OF THE PREFERRED EMBODIMENTS

Figure 1:
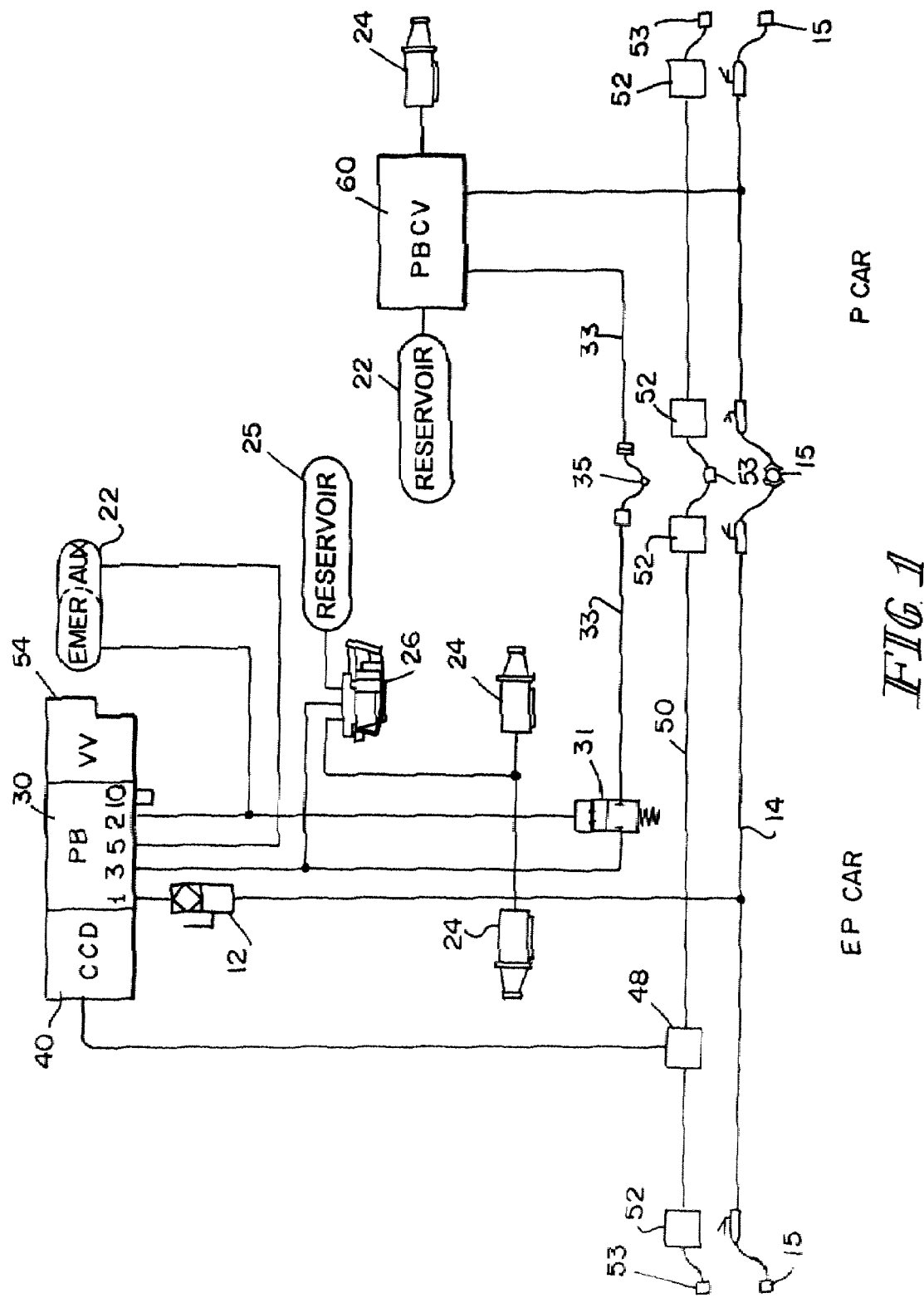
FIG. 1 is a schematic of a married pair of cars having one car with an electro-pneumatic brake and a second car with a pneumatic brake in its most general terms according to the present disclosure.

FIG. 1 shows an electro-pneumatic car (EP car) and a pneumatic car (P-car) as a married pair of cars. The married pair of cars is part of a train which includes a brake pipe 14 extending through the train and coupled together by couplers or glad-hands 15. It also includes a train line 50 with junction boxes 52 and couplers 53 to receive power and control signals for the electro-pneumatic brake valves. The EP car includes a pipe bracket 30 with an EP brake valve 40 and a vent valve 54. The details of the EP brake valve are described in U.S. Pat. No. 6,457,782 which is incorporated herein by reference. Such an EP valve is available from New York Air Brake as an EP60, but other equivalent EP brake valves may be used. The numbers used in the drawings will generally correspond to that in U.S. Pat. No. 6,457,782. Wherever possible such a reference will be made thereto for the details. The EP portion 40 is connected through junction box 48 to the train line 50. The box 48 includes a car ID.

The brake pipe 14 is connected through a cut-off cock 12 to port 1 of the pipe bracket 30. A reservoir 22 is shown as a combined reservoir having an emergency and an auxiliary section connected to ports 2 and 5, respectfully. Port 3 of the pipe bracket 30 is connected to an empty load device 26 having its own reservoir 25. The output signal of the empty load device 26 is connected to the brake cylinders 24. Although a pair of brake cylinders is shown, a single brake cylinder may be provided on the EP car. The structure described so far is that of a standard EP car. Pipe bracket 30 is a standard pipe bracket for pneumatic or EP brake valves.

Also connected to port 3 is a valve 31 connecting the pneumatic brake signal to the brake signal pipe 33, which interconnects the EP car and the P car. Valve 31 is responsive to reservoir pressure or pneumatic signal to close the connection between the P car and the brake signal pipe 33. In FIG. 1, the valve 31 is shown as a two-way valve which is spring biased to its disconnect or closed position and is piloted to its connect or open position by the pressure in the emergency reservoir at port 2 of the pipe bracket 30. For all brake apply or release, brake cylinder pressure is applied and released through the pipe bracket port 3 to brake signal pipe 33. Once the emergency reservoir is reduced to a given value, for example, 40 psi, the spring will overcome the pilot pressure and disconnect port 3 from the brake signal pipe 33. This will isolate and allow the brake cylinders 24 to maintain a brake apply condition even though the brake signal pipe 33 has been vented as has the brake pipe 14.

The pneumatic P car includes a pneumatic brake control valve PBCV 60 connected to the brake pipe 14, the brake signal pipe 33, reservoir 22 and brake cylinder 24. The pneumatic brake control valve 60 is responsive to the first EP car brake signals on the brake signal pipe 33 and the brake pipe pressure on brake pipe 14 to produce second car pneumatic apply and release brake signals for the brake cylinder 24 of the second car. The second car's pneumatic apply and release signals correspond to the apply and release brake signals received from the brake signal pipe 33. For an emergency pressure on the brake pipe 14, the pneumatic brake control valve 60 produces the car pneumatic apply brake signal from the reservoir 22 to its cylinder 24, as long as the brake signal pipe 33 is also vented to zero. The pneumatic brake control valve 60 also includes a disconnect of the brake signal pipe 33 in response to an emergency pressure in the brake pipe 14.

Figure 2:
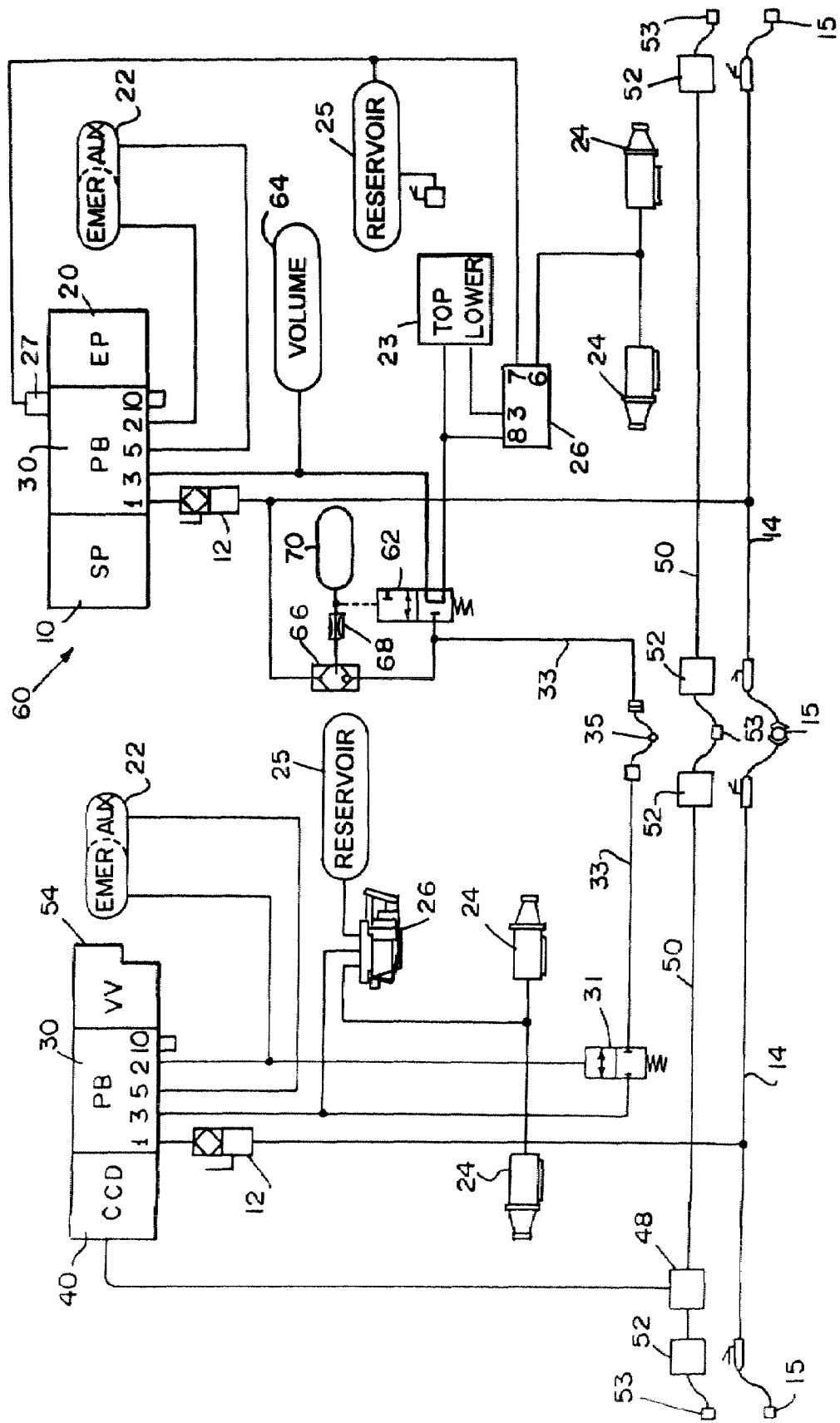
FIG. 2 is a first embodiment of the married pair of cars with a standalone EP brake valve according to the present disclosure.
Figure 3:
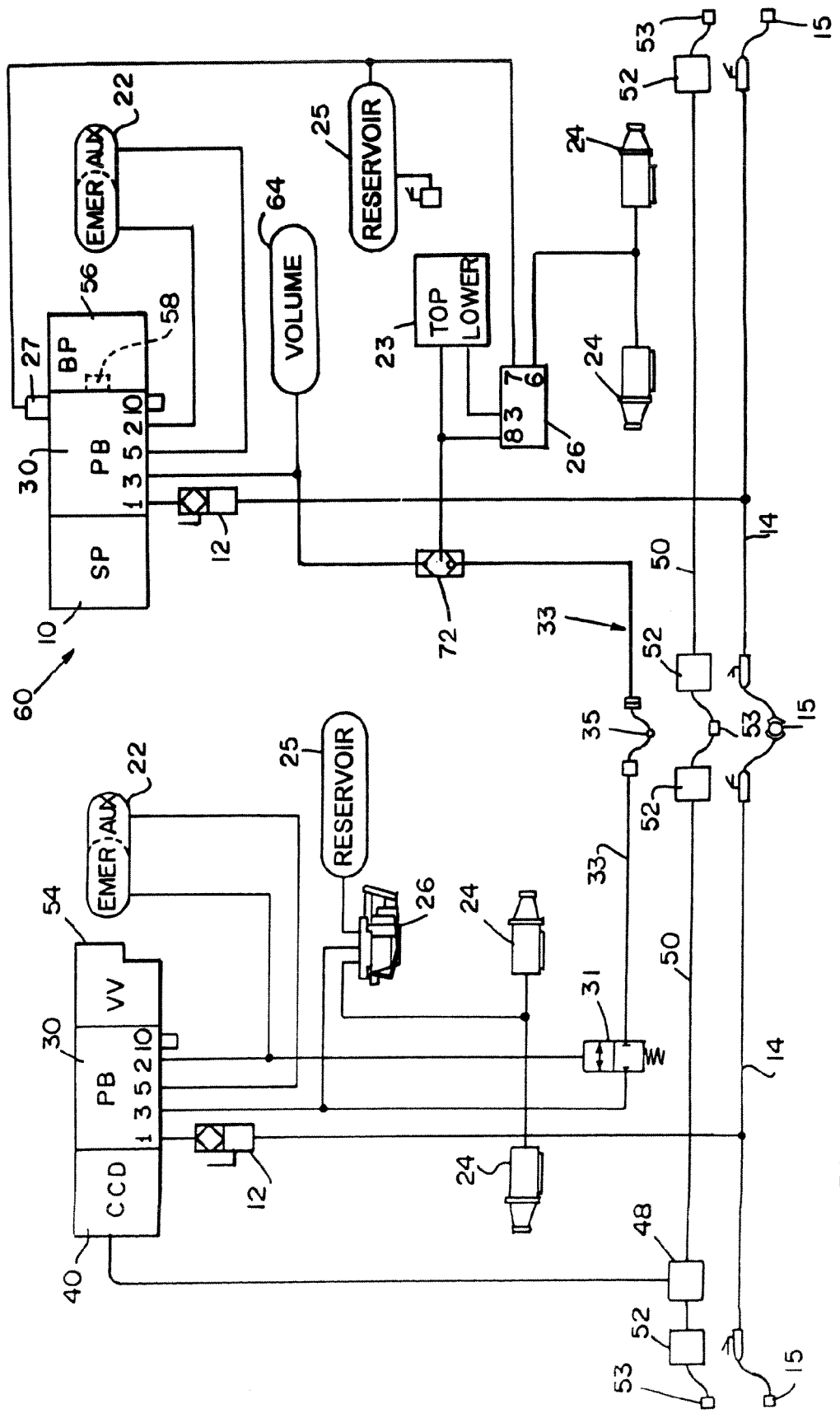
FIG. 3 is a second embodiment of the married pair of cars with a standalone EP brake valve according to the present disclosure.
Figure 4:
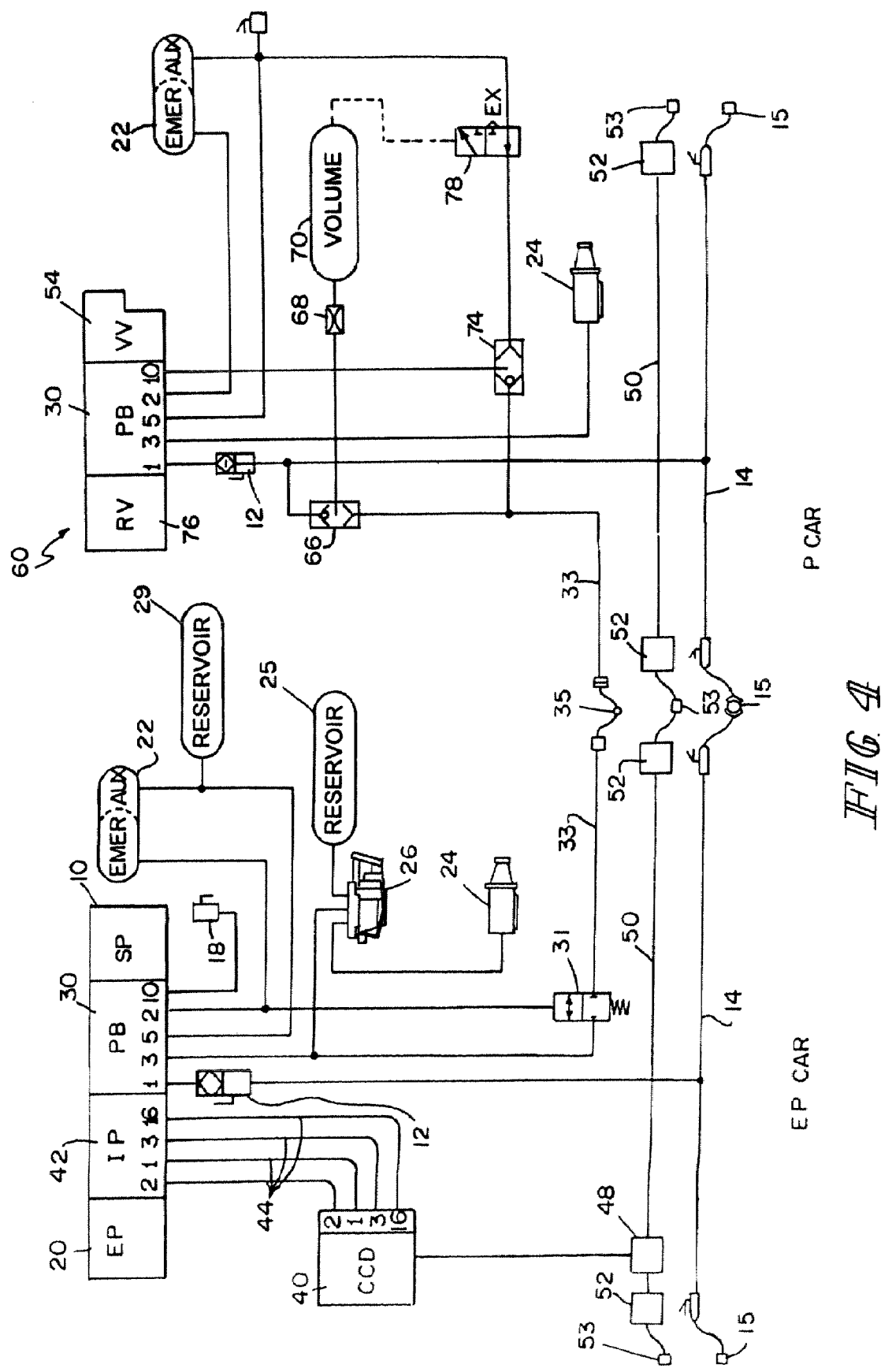
FIG. 4 is a third embodiment of a married pair of cars with an overlay EP brake valve according to the present disclosure.
Figure 5:
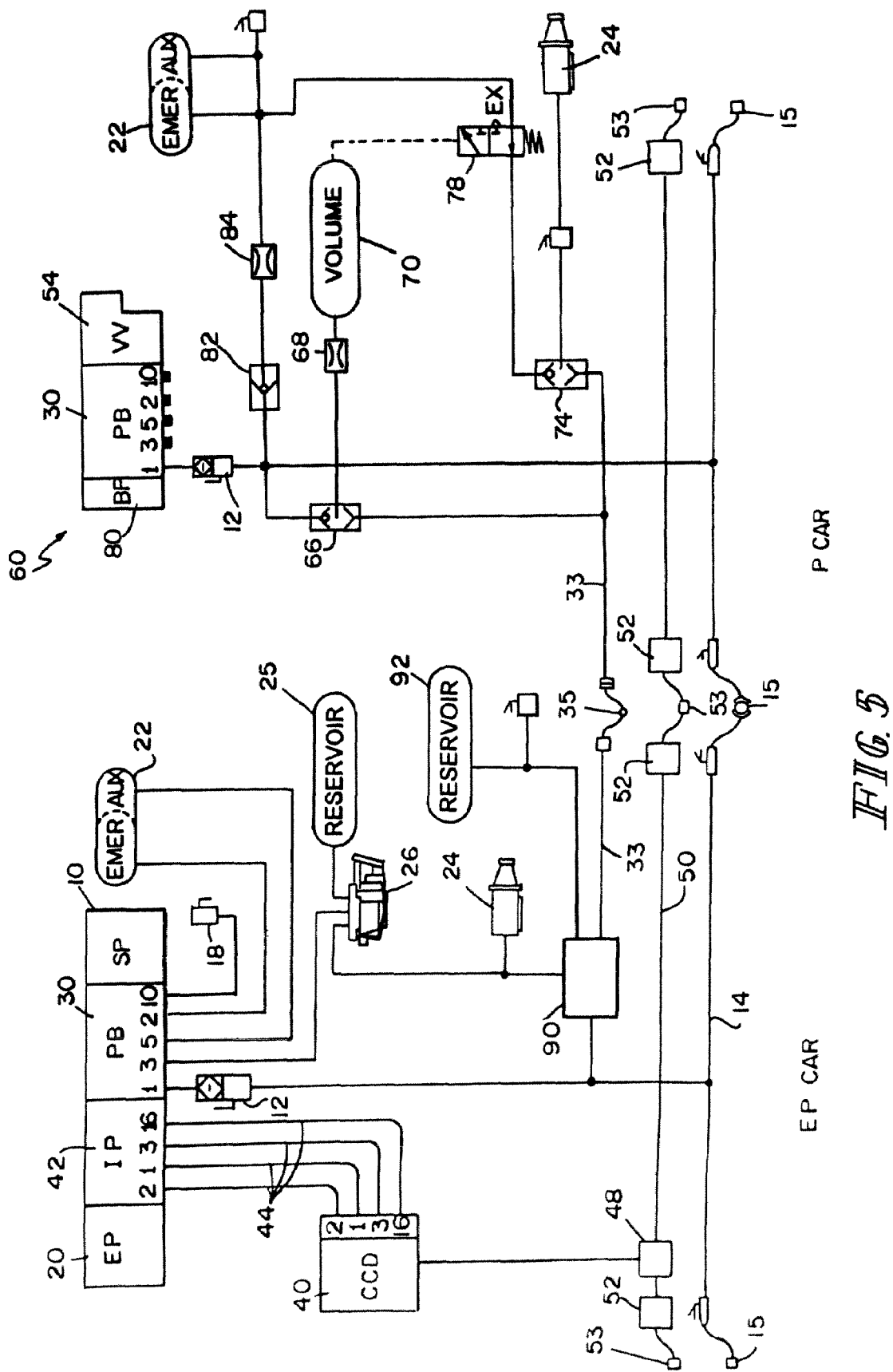
FIG. 5 is a fourth embodiment of a married pair of cars with an overlay EP brake valve according to the present disclosure.

Even though FIGS. 1 through 3 show a standalone electro-pneumatic brake in the EP car and FIGS. 4 and 5 show an overlay electro-pneumatic brake in the EP, either style or type of EP brake valve may be used in FIGS. 1 though 5. The different drawings show different implementations of the pneumatic brake control valve 60 as well as the valve 31.

The first embodiment of the pneumatic brake control valve 60 is illustrated in FIG. 2. A standard pneumatic brake valve including pipe bracket 30 and a service portion 10 and an emergency portion 20 is shown. This may be, for example, a DB 60 available from New York Air Brake Corporation or its equivalent. The brake pipe 14 is connected to the manifold 30 by cut-of cock 12. The combined reservoir 22 is also connected to the pipe bracket 30. The brake signal output at port 3 of the pipe bracket 30 is connected to a select or piloted three-way valve 62. The three-way valve 62 is spring-biased into the shown position where the brake signal output port 3 is connected to the empty load relay 26 and the VTA empty load valve 23. The relay valve 26 provides a brake signal to the brake cylinders 24 from a reservoir 25 which is charged from the pipe bracket 30 through charging check valve 27.

The shown position of valve 62 is the emergency position when there is a break-in-two. This cuts off the connection of the empty load relay valve 26 from the open brake signal pipe. A connection is made from port 3 of the pipe bracket 30 to port 8 of the E/L relay 26. This maintains the brakes 24 applied in the P car.

Three-way valve 62 is biased to its second position connecting the brake signal pipe 33 to the empty load relay valve 26 by a pilot pressure from a double check valve 66 connected by a choke 68 to a volume 70 to the pilot port of valve 62. The double check valve 66 selects the higher of the two inputs as the pilot signal. Connected to the double check valve 66 are the brake pipe 14 on one side and the brake signal pipe 33 on the other side.

Normally, in EP operation, the signal from the brake pipe 14 is high providing appropriate high signal to charge the volume 70 and to bias the pilot three-way valve 62 to the second position connecting the brake signal pipe 33 to the empty load relay valve 26. Thus the brake apply and release signals on the brake signal pipe 33 from the EP car are provided and a corresponding brake signal on the P car is produced. Volume 70 and choke 68 offers a time delay from a decrease of the signal from the double check valve 66 so as to maintain the three-way valve 62 in the second position when brake pipe pressure goes to zero. This allows the brake signal pipe time to increase its pressure to main valve 62 open to the brake signal pipe.

On a break-in-two or disconnect, the brake pipe 14 will go to zero or an emergency condition as well as the other brake signal pipe 33 input to the double check valve 66. Upon the draining of the volume 70 through the choke 68, the valve 62 will move from its position connecting the brake signal pipe 33 to the empty load relay valve 26 to the position shown in FIG. 2. This closes the connection of the brake signal pipe 33 from port 8 of empty load relay valve 26 and connects the brake signal port 3 of the pipe bracket 30 to port 8 of the empty load relay valve 26. Thus, the standard pneumatic brake valve 10, 20, 30 applies an emergency brake to the brake cylinders 24.

FIG. 3 illustrates another embodiment of the pneumatic brake control valve 60. The pneumatic valve is shown including pipe bracket 30, service portion 10, and a blanking plate 56 instead of the emergency portion 20. The blanking plate 56 includes a passage 58 connecting the brake cylinder ports at the emergency interface of the pipe bracket 30. The blanking plate 56 may be used also in FIG. 2. In this embodiment, the three-way valve or select valve 62 is replaced by a simple double check valve 72. The two inputs to the select valve 72 are the brake signal from port 3 of the pipe bracket 30 and the brake signal on the brake signal pipe 33. Under normal operations, the brake pipe 14 is charged and the pneumatic brake valve 10, 20, 30 does not provide any signal to the select valve 72. Thus, the input to the empty load relay valve 26 is the braking signal on brake signal pipe 33. For an emergency condition, the brake pipe 14 has an emergency pressure which in this case would be zero due to a break-in-two and the pneumatic brake valve 10, 20, 30 will produce an emergency braking pressure on port 3. This will force the select valve 72 to provide the emergency braking pressure to the empty load relay 26. Break-in-two would occur to bring the brake pipe 14 as well as the brake signal pipe 33 to zero. The movement of the select valve 72 will also block off the connection to the brake signal pipe 33. A volume 64 is connected to port 3 of the pipe bracket 30 to provide proper brake cylinder pressure development during an emergency brake application.

FIG. 4 shows a further embodiment of the pneumatic brake control valve 60. The pneumatic brake valve includes a pipe bracket 30, a vent valve 54, and a relay valve and charging check valve 76. The charging check connects the brake pipe port 1 to ports 2 and S to charge the reservoir 22. The relay valve portion of 76 is responsive to the input on port 10 to provide the braking signal on port 3 directly to the brake cylinder 24. An empty load device may be provided in between if desired.

The port 10 of the pipe bracket 30 is connected to a select or double check valve 74. One of the inputs is from the brake signal pipe 33. The other input is from the two-positioned piloted valve 78 which is shown spring-biased connecting the reservoir 22 to the select valve 74. This is the emergency position as long as the brake signal pipe 33 is vented to zero. Piloted valve 78 is piloted to its second position which connects the select valve 74 to atmosphere. A double check valve 66 has an input from the brake pipe 14 on one side and from the brake signal pipe 33 on the other side. The output is provided through choke 68 and volume 70 to produce the pilot signal for the three-way valve or piloted valve 78.

Under normal conditions, the brake pipe pressure 14 is high and the double check valve 66 provides the brake pipe pressure to piloted valve 78 to its exhaust position. This allows the transmission of the brake signal from the brake signal pipe 33 to port 10 of the pipe bracket 30. Thus the relay valve 76 will provide proportional signals to the brake cylinder 24 to that received from the brake signal pipe 33. In a break-in-two condition, the brake pipe 14 will go low as will the brake signal pipe 33. Thus, the volume 70 will drain through choke 68 and an appropriate pressure will allow the piloted valve 78 to rise to its shown position connecting the reservoir 22 to the double check valve 74. This will provide a high signal to port 10 for the relay valve 76 to apply an emergency brake to brake cylinder 24. This will also seal or disconnect the brake signal pipe 33 from port 10 of the pipe bracket 30.

Another embodiment of the brake pipe control valve 60 is illustrated in FIG. 5. The pneumatic brake control valve 60 includes a pipe bracket 30 and a vent valve 54. The other face of the pipe bracket 30 is closed by blanking plate 80. Brake pipe 14 is connected to the pipe bracket 30 by cut-off cock 12. The charging of the reservoir 22 from the brake pipe 14 is provided by charging check valve 82 and the choke 84. These functions were provided in the relay valve and charging check valve 76 in the embodiment of FIG. 4. As in the previous embodiment, a piloted three-way valve 78 provides braking pressure from the reservoir 22 for break-in-two condition through double check valve 74. The other input to the double check valve 74 is the brake signal on the brake signal pipe 33. Different from the previous embodiment, the output of the select or double check valve 74 is provided directly to the brake cylinder 24 instead of through a relay valve 76 connected to the pipe bracket 30. As discussed in the previous embodiment, an empty load valve may be provided at the output of the double check valve 74 and connected to the brake cylinder 24. The piloted valve 78 is piloted by the volume 70 which is charged or discharged by a choke 68 and the double check valve 66. The input to the double check valve 66 as in the previous embodiment is the brake pipe 14 and the brake signal pipe 33.

As in the previous embodiment, under normal operation, when the brake pipe pressure is normally high, the double check valve 66 maintains the volume 70 charged. This pilots the piloted valve 78 to its lower position which disconnects the reservoir 22 from the select valve 74. This allows the brake signal pipe 33 to control the brake cylinder 24 directly. Under brake-in-two conditions, the output of the double check valve 66 will be at atmosphere on both sides, causing the volume 70 to drain through the choke 68. At an appropriate low level of the volume 70, the piloted valve 78 will rise to the shown position connecting the reservoir 22 to the double check valve 74. This provides an emergency application of the brake cylinder 24 and also closes the connection of the brake signal pipe 33 from the brake cylinder 24.

The embodiment of FIG. 5 also shows a modification of the disconnect valve 31 of the previous figures. The two-way valve 31 is replaced by a relay and charging check valve 90. The relay and charging check valve 90 is connected to the brake pipe 14 and charges a reservoir 92 through the charging check valve portion. An input signal to the relay valve 90 is the brake signal for the brake cylinder 24 on the EP car. The output of relay valve 90 is connected to the brake signal pipe 33. The output on brake signal pipe 33 is a proportional signal from reservoir 92 based on the input to the brake cylinder 24. The relay valve 90 inherently isolates the brake cylinder 24 of the EP car from the brake signal pipe 33.

Although the present method has been described and illustrated in detail, it is to be clearly understood that this is done by way of illustration and example only and is not to be taken by way of limitation. As previously mentioned, even though FIGS. 1 through 3 show a standalone electro-pneumatic brake in the EP car and FIGS. 4 and 5 show an overlay electro-pneumatic brake in the EP, either style or type of EP brake valve may be used in FIGS. 1 though 5. The scope of the present method is to be limited only by the terms of the appended claims.

What is claimed:

1. A train including a brake pipe and an electrical train line extending from at least one locomotive through at least first and second cars which are adjacent to each other, wherein:
  a brake signal pipe connects the first and second cars; the first car includes a first brake cylinder, a first reservoir, an electro-pneumatic brake valve responsive to electric signals on the train line to produce a first pneumatic apply brake signal from the first reservoir and first pneumatic release brake signal for the first brake cylinder and the brake signal pipe, and a first valve to transmit the first brake signals to the brake signal pipe and to isolate the connection to the brake signal pipe for a break-away of one of the first and second cars; and
  the second car includes a second brake cylinder, a second reservoir, and a pneumatic brake control valve responsive to the first brake signals on the brake signal pipe and brake pipe pressure in the brake pipe to produce a second pneumatic apply and release brake signals for the second brake cylinder corresponding to the first apply and release brake signals for a non-emergency pressure in the brake pipe and to produce a second pneumatic apply brake signal from the second reservoir for an emergency pressure in the brake pipe and also the first brake signal being zero.

2. The train according to claim 1 wherein the pneumatic brake control valve includes:
  a pneumatic brake valve responsive to brake pipe pressure to produce a third pneumatic apply brake signal from the second reservoir and a third release brake signal; and
  a select valve to transmit the first apply and release brake signals as the second apply and release brake signals for the non-emergency pressure on the brake pipe and to transmit the third apply brake signal as the second apply brake signal and close the connection of the brake signal pipe from the second brake cylinder for emergency pressure in the brake pipe and also the first apply and release brake signals being zero.

3. The train according to claim 2 wherein the select valve is a double check valve having the first and third brake signals as inputs and the second brake signals as an output.

4. The train according to claim 2
  wherein the select valve is a two position piloted valve for transmitting the first brake signals in a first position and transmitting the third brake signals and closing the connection of the second brake cylinder to the brake signal pipe in a second position; and
  including a piloting valve responsive to pressure in the brake pipe to provide a pilot signal to maintain the piloted valve in the first position for a non-emergency pressure in the brake pipe.

5. The train according to claim 1 wherein the pneumatic brake control valve includes:
  a relay valve responsive to an input signal on an input to produce the second release brake signal and to produce the second apply brake signal from the second reservoir and proportional to the input signal; and
  a select valve to transmit the first apply and release brake signals as the input signal of the relay valve for the non-emergency pressure on the brake pipe and to transmit pressure from the second reservoir as the input signal and close the connection of the brake signal pipe from input of the relay valve for emergency pressure in the brake pipe and also the first apply and release brake signals being zero.

6. The train according to claim 5 including:

a two position piloted valve for connecting an atmosphere condition to an output in a first position and connecting the pressure signals from the second reservoir to its output in a second position; and a piloting valve responsive to pressure in the brake pipe to provide a pilot signal to maintain the piloted valve in the first position for a non-emergency pressure in the brake pipe.

7. The train according to claim 6 wherein the select valve is a double check valve having inputs connected to the brake signal pipe and the output of the piloted valve and an output connected to the input of the relay valve.

8. The train according to claim 1 wherein the pneumatic brake control valve includes:

a two position piloted valve for connecting an atmosphere condition to an output in a first position and connecting the pressure signals from the second reservoir to its output in a second position;

a piloting valve responsive to pressure in the brake pipe to provide a pilot signal to maintain the piloted valve in the first position for a non-emergency pressure in the brake pipe; and a double check valve having inputs connected to the brake signal pipe and the output of the piloted valve and an output connected to the second brake cylinder.

9. The train according to claim 1 wherein the first valve includes a piloted valve having a first position connecting the first car to the brake signal pipe and a second position closing the connection of the first car to the brake signal pipe and a pilot input connected to the reservoir for maintaining the pilot valve in the first position for a non-emergency pressure value in the first reservoir.

10. The train according to claim 1 including a third reservoir on the first car and wherein the first valve includes a relay valve responsive to the first brake signals on an input to transmit the first release brake signal and to transmit the first apply brake signal from the third reservoir and proportional to the input signal.

* * * * *